United States Patent
Ma et al.

(10) Patent No.: US 9,088,442 B2
(45) Date of Patent: Jul. 21, 2015

(54) METHOD, APPARATUS, AND SYSTEM FOR SENDING AND RECEIVING SERVICE DATA

(71) Applicant: HUAWEI TECHNOLOGIES CO., LTD., Shenzhen, Guangdong (CN)

(72) Inventors: Teng Ma, Chengdu (CN); Zihuan Chen, Chengdu (CN); Ning Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/319,350

(22) Filed: Jun. 30, 2014

(65) Prior Publication Data

US 2014/0314162 A1    Oct. 23, 2014

Related U.S. Application Data

(63) Continuation of application No. PCT/CN2012/073321, filed on Mar. 30, 2012.

(51) Int. Cl.
*H04L 27/00* (2006.01)
*H04L 1/00* (2006.01)

(52) U.S. Cl.
CPC .......... *H04L 27/0008* (2013.01); *H04L 1/0082* (2013.01); *H04L 27/0012* (2013.01); *H04L 1/0003* (2013.01)

(58) Field of Classification Search
CPC . H04L 1/0003; H04L 1/0082; H04L 27/0008; H04L 27/0012
See application file for complete search history.

(56) References Cited

U.S. PATENT DOCUMENTS

| 5,903,550 A | 5/1999 | Spock |
| 6,407,993 B1 | 6/2002 | Moulsley |
| 6,445,745 B1 | 9/2002 | Bontu et al. |

(Continued)

FOREIGN PATENT DOCUMENTS

| CN | 1212799 | 3/1999 |
| CN | 1890932 | 1/2007 |

(Continued)

OTHER PUBLICATIONS

Chinese Office Action dated May 4, 2014 in corresponding Chinese Patent Application No. 201280000308.5.

(Continued)

*Primary Examiner* — Leon Flores
(74) *Attorney, Agent, or Firm* — Staas & Halsey LLP

(57) ABSTRACT

Embodiments of the present invention disclose a method, an apparatus, and a system for sending and receiving service data, where the method includes: first, obtaining, by a sending end, a target modulation mode different from a current modulation mode; and then, generating, by the sending end, invalid data, and temporarily storing service data at the same time; and then, performing encapsulation and mapping on the invalid data, switching the current modulation mode to the target modulation mode, modulating encapsulated and mapped invalid data according to the target modulation mode, and sending modulated invalid data to a receiving end; and finally, after the sending end completes the encapsulation and mapping on the invalid data, performing encapsulation and mapping on the temporarily stored service data, modulating encapsulated and mapped service data according to the target modulation mode, and sending modulated service data to the receiving end.

8 Claims, 5 Drawing Sheets

(56) References Cited

U.S. PATENT DOCUMENTS

| | | |
|---|---|---|
| 7,471,903 B1 | 12/2008 | Friskney et al. |
| 2004/0097207 A1 | 5/2004 | Sandaralingam |
| 2007/0058741 A1 | 3/2007 | Inagawa |
| 2007/0064833 A1 | 3/2007 | Sahota |
| 2009/0015344 A1 | 1/2009 | Lampe et al. |
| 2013/0107976 A1 | 5/2013 | Matsutani et al. |

FOREIGN PATENT DOCUMENTS

| | | |
|---|---|---|
| CN | 1933472 | 3/2007 |
| CN | 101106689 | 1/2008 |
| CN | 101895330 | 11/2010 |
| EP | 0984595 | 3/2000 |
| WO | WO2012/014579 | 2/2012 |

OTHER PUBLICATIONS

PCT International Search Report and Written Opinion of the International Searching Authority dated Jan. 10, 2013 in corresponding International Patent Application No. PCT/CN2012/073321.

"Distance-Adaptive Spectrum Resource Allocation in Spectrum-Sliced Elastic Optical Path Network", Jinno et al., Topics in Optical Communications, IEEE Communications Magazine, Aug. 2010, pp. 138-145.

Extended European Search Report, dated Sep. 24, 2014, in corresponding European Application No. 12742712.8 (10 pp.).

METHOD, APPARATUS, AND SYSTEM FOR SENDING AND RECEIVING SERVICE DATA

CROSS-REFERENCE TO RELATED APPLICATIONS

This application is a continuation of International Application No. PCT/CN2012/073321, filed on Mar. 30, 2012, which is hereby incorporated by reference in its entirety.

TECHNICAL FIELD

Embodiments of the present invention relate to the field of network systems, and in particular, to a method, an apparatus, and a system for sending and receiving service data.

BACKGROUND

With the emergence of various services such as a video service, bandwidth pressure on a transport network becomes higher, and costs of using a WDM (Wavelength Division Multiplexing, wavelength division multiplexing) technology also becomes higher. Variable spectrum, as a network technology that can flexibly configure an optical fiber spectrum resource according to a signal rate and spectral width, may be used as an important technology to effectively alleviate the bandwidth pressure.

On a conventional WDM network, regardless of the number of spans to pass through and transmission distance, each optical path at a same rate must be transmitted according to a spectral bandwidth stipulated by the ITU-T (International Telecommunication Union-Telecommunication Standardization Sector); for the robustness and upgradability of a system, networking is designed according to the highest OSNR (Optical Signal-to-Noise Ratio, optical signal-to-noise ratio) standard, that is, a same modulation mode and spectral bandwidth are adopted for all paths; as a result, the OSNR of a short optical path with the small number of spans is far greater than the OSNR that is actually required, wasting a spectrum resource of the system. A variable spectrum technology may flexibly select an appropriate modulation mode and spectrum resource according to the length of an optical path and the number of spans to pass through, so as to achieve an objective of more effectively utilizing a spectrum resource of a line and improving the spectrum efficiency. How to implement hitless switching of a modulation mode to ensure normal sending and receiving of service data is a key point of the variable spectrum technology. Currently, when a modulation mode is switched, a manner of inserting overhead bits by a sending end is adopted to instruct a receiving end, so as to implement sending and receiving of service data. However, this manner requires protocol processing at both the receiving end and sending end, resulting in complex implementation and low reliability.

SUMMARY

Embodiments of the present invention provide a method, an apparatus, and a system for sending and receiving service data, so as to implement hitless switching of a modulation mode to ensure normal sending and receiving of service data, and solve problems of complex implementation and low reliability in the prior art.

The following technical solutions are adopted in the embodiments of the present invention:

An aspect provides a method for sending service data, including:

obtaining, by a sending end, a target modulation mode different from a current modulation mode;

generating, by the sending end, invalid data, and temporarily storing service data at the same time;

performing, by the sending end, encapsulation and mapping on the invalid data, switching the current modulation mode to the target modulation mode, modulating encapsulated and mapped invalid data according to the target modulation mode, and sending modulated invalid data to a receiving end; and after the sending end completes the encapsulation and mapping on the invalid data, obtaining, by the sending end, the temporarily stored service data, performing encapsulation and mapping on the temporarily stored service data, modulating encapsulated and mapped service data according to the target modulation mode, and sending modulated service data to the receiving end.

An aspect provides a method for receiving service data, including:

receiving, by a receiving end, modulated data; where the modulated data includes modulated invalid data and modulated service data;

concurrently demodulating, by the receiving end, the modulated data according to all modulation modes supported by the receiving end to determine a target modulation mode;

switching, by the receiving end, a current modulation mode to the target modulation mode, and demodulating the modulated data according to the target modulation mode to obtain encapsulated and mapped data; and performing, by the receiving end, decapsulation and demapping on the encapsulated and mapped data to obtain the service data.

An aspect provides another method for receiving service data, including:

receiving, by a receiving end, modulated service data;

temporarily storing, by the receiving end, the modulated service data, and at the same time concurrently demodulating the modulated service data according to all modulation modes supported by the receiving end to determine a target modulation mode;

obtaining, by the receiving end, the temporarily stored modulated service data, switching a current modulation mode to the target modulation mode, and demodulating the temporarily stored modulated service data according to the target modulation mode to obtain encapsulated and mapped service data; and performing, by the receiving end, decapsulation and demapping on the encapsulated and mapped service data to obtain the service data.

An aspect provides an apparatus for sending service data, including:

an obtaining unit, configured to obtain a target modulation mode different from a current modulation mode;

a temporarily storing unit, configured to temporarily store the service data at the same time when a processing unit generates invalid data;

the processing unit, configured to generate the invalid data after the obtaining unit obtains the target modulation mode; and further configured to: after the encapsulation and mapping on the invalid data is completed, obtain the service data temporarily stored by the temporarily storing unit, and perform encapsulation and mapping on the temporarily stored service data;

a modulating unit, configured to switch the current modulation mode to the target modulation mode, and modulate, according to the target modulation mode, invalid data encapsulated and mapped by the processing unit; and further configured to modulate, according to the target modulation mode, service data encapsulated and mapped by the processing unit; and a sending unit, configured to send invalid data modulated by the modulating unit to a receiving end; and further configured to send service data modulated by the modulating unit to the receiving end.

An aspect provides a first apparatus for receiving service data, including:

a receiving unit, configured to receive modulated data; where the modulated data includes modulated invalid data and modulated service data;

a determining unit, configured to concurrently demodulate the modulated data according to all modulation modes supported by the first apparatus to determine a target modulation mode;

a demodulating unit, configured to switch a current modulation mode to the target modulation mode; and further configured to demodulate the modulated data according to the target modulation mode to obtain encapsulated and mapped data; and a processing unit, configured to perform decapsulation and demapping on the encapsulated and mapped data to obtain the service data.

An aspect further provides a second apparatus for receiving service data, including:

a receiving unit, configured to receive modulated service data;

a temporarily storing unit, configured to temporarily store the modulated service data;

a determining unit, configured to, at the same time when the modulated service data is temporarily stored, concurrently demodulate the modulated service data according to all modulation modes supported by this second apparatus to determine a target modulation mode;

a demodulating unit, configured to obtain the modulated service data temporarily stored by the temporarily storing unit, switch a current modulation mode to the target modulation mode, and demodulate the temporarily stored modulated service data according to the target modulation mode to obtain encapsulated and mapped service data; and a processing unit, configured to perform decapsulation and demapping on the encapsulated and mapped service data to obtain the service data.

An aspect provides a system for receiving and sending service data, including:

the sending apparatus and the first apparatus for receiving service data.

An aspect provides another system for receiving and sending service data, including:

a sending apparatus and the second apparatus for receiving service data; where the sending apparatus is configured to obtain a target modulation mode different from a current modulation mode; further configured to perform encapsulation and mapping on service data; further configured to switch the current modulation mode to the target modulation mode, and modulate encapsulated and mapped service data according to the target modulation mode; and further configured to send modulated service data to the second apparatus for receiving service data.

Embodiments of the present invention provide a method, an apparatus, and a system for sending and receiving service data, so as to implement hitless switching of a modulation mode and ensure normal sending and receiving of service data without requiring a receiving end and a sending end to perform protocol processing. Solutions are simple and reliability is high.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a method, an apparatus, and a system for sending and receiving service data. To make the technical solutions of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1A:
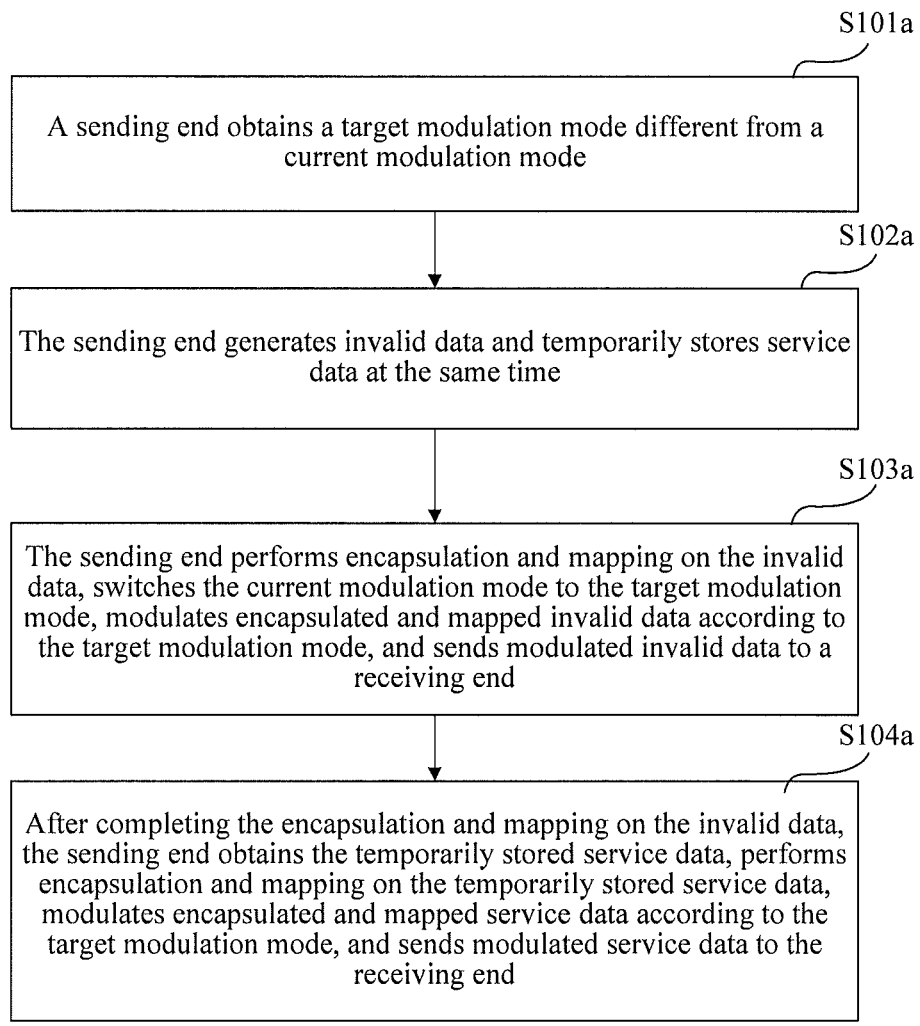
FIG. 1a is a flowchart of a method for sending service data according to an embodiment of the present invention.

A process of a method for sending service data according to an embodiment of the present invention is shown in FIG. 1a. The method includes the following steps:

Step S101a: A sending end obtains a target modulation mode different from a current modulation mode.

Step S102a: The sending end generates invalid data and temporarily stores service data at the same time.

Step S103a; The sending end performs encapsulation and mapping on the invalid data, switches the current modulation mode to the target modulation mode, modulates encapsulated and mapped invalid data according to the target modulation mode, and sends modulated invalid data to a receiving end.

A duration of sending the modulated invalid data is longer than or equal to a sum of a duration of determining the target modulation mode by the receiving end and a duration of frame synchronization during decapsulation and demapping.

Before performing the encapsulation and mapping on the invalid data, the sending end may first complete encapsulation and mapping on a current frame of the service data.

Step S104a: After completing the encapsulation and mapping on the invalid data, the sending end obtains the temporarily stored service data, performs encapsulation and mapping on the temporarily stored service data, modulates encapsulated and mapped service data according to the target modulation mode, and sends modulated service data to the receiving end.

Figure 1B:
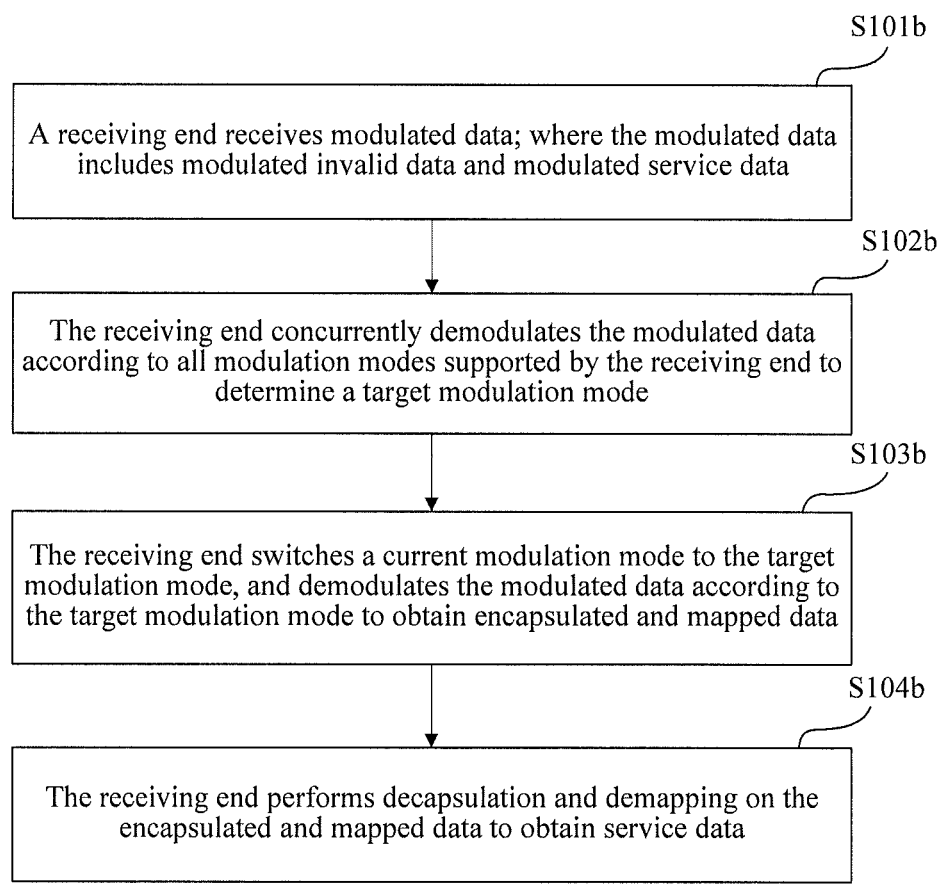
FIG. 1b is a flowchart of a method for receiving service data according to an embodiment of the present invention.

A process of a method for receiving service data according to another embodiment of the present invention is shown in FIG. 1b. The method includes the following steps:

Step S101b: A receiving end receives modulated data; where the modulated data includes modulated invalid data and modulated service data;

Step S102b: The receiving end concurrently demodulates the modulated data according to all modulation modes supported by the receiving end to determine a target modulation mode.

Specifically, the receiving end concurrently demodulates the modulated data according to all the modulation modes supported by the receiving end to obtain a constellation point of each modulation mode, calculates a mean squared error between the constellation point of each modulation mode and a standard constellation point in a constellation diagram of the modulation mode, and determines the modulation mode that has the minimum value of the mean squared error as the target modulation mode.

Step S103b: The receiving end switches a current modulation mode to the target modulation mode, and demodulates the modulated data according to the target modulation mode to obtain encapsulated and mapped data.

Step S104b: The receiving end performs decapsulation and demapping on the encapsulated and mapped data to obtain the service data.

Figure 1C:
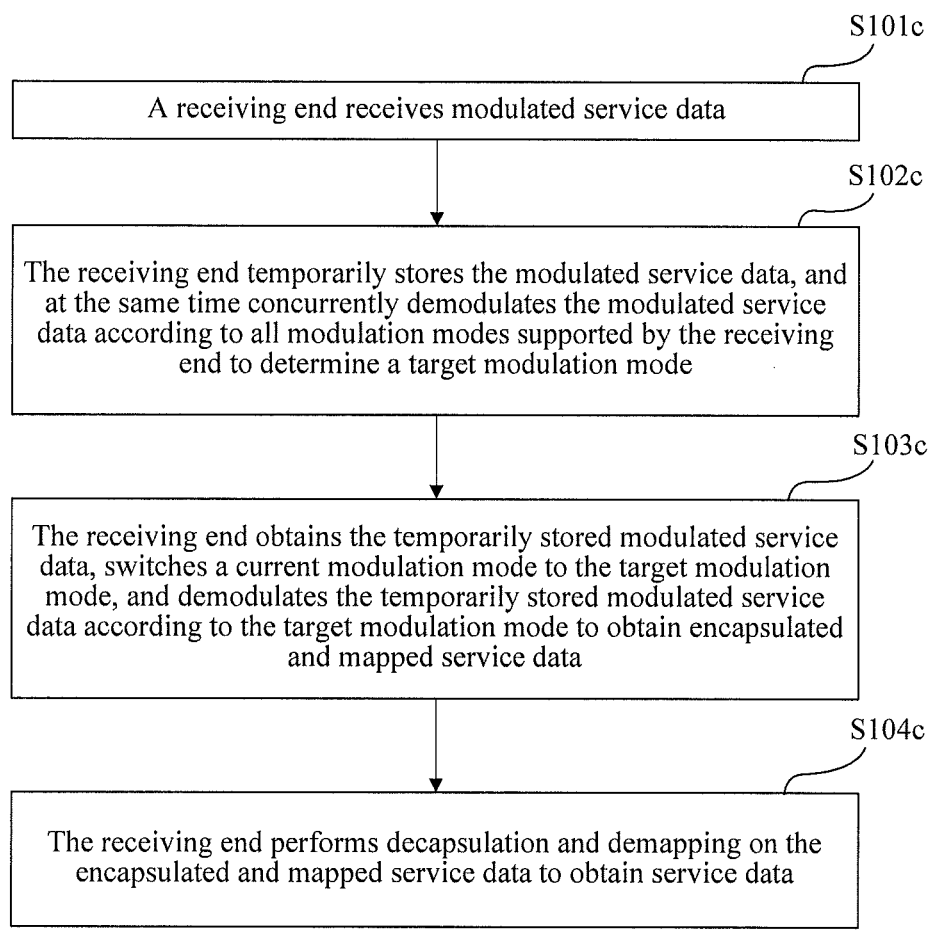
FIG. 1c is a flowchart of another method for receiving service data according to an embodiment of the present invention.

A process of a method for receiving service data according to still another embodiment of the present invention is shown in FIG. 1c. The method includes the following steps:

Step S101c: A receiving end receives modulated service data.

Step S102c: The receiving end temporarily stores the modulated service data, and at the same time concurrently demodulates the modulated service data according to all modulation modes supported by the receiving end to determine a target modulation mode.

A duration of to temporarily storing the modulated service data by the receiving end is equal to a duration from a time when the receiving end receives the modulated service data to a time when the modulation mode is switched to the target modulation mode.

The concurrently demodulating the modulated service data according to all modulation modes supported by the receiving end to determine a target modulation mode specifically includes: concurrently demodulating the modulated service data according to all the modulation modes supported by the receiving end to obtain a constellation point of each modulation mode; calculating a mean squared error between the constellation point of each modulation mode and a standard constellation point in a constellation diagram of the modulation mode; and determining the modulation mode that has the minimum value of the mean squared error as the target modulation mode.

Step S103c: The receiving end obtains the temporarily stored modulated service data, switches a current modulation mode to the target modulation mode, and demodulates the temporarily stored modulated service data according to the target modulation mode to obtain encapsulated and mapped service data.

Step S104c: The receiving end performs decapsulation and demapping on the encapsulated and mapped service data to obtain the service data.

In order to make the advantages of the technical solutions of the present invention clearer, the present invention is described in detail in the following with reference to the accompanying drawings and embodiments.

This embodiment provides a method for sending and receiving service data. The method includes:

Step S201: A sending end obtains a target modulation mode different from a current modulation mode.

The target modulation mode is a modulation mode among the multiple modulation modes that are supported by the sending end and a receiving end.

Specifically, the sending end may obtain the target modulation mode according to service data information or software configuration.

Step S202: The sending end generates invalid data and temporarily stores service data at the same time.

The invalid data may be random data or data with a special code type, and is related to a transmission frame format of the service data, which is not limited by this embodiment.

Step S203: The sending end performs encapsulation and mapping on the invalid data, switches the current modulation mode to the target modulation mode, modulates encapsulated and mapped invalid data according to the target modulation mode, and sends modulated invalid data to the receiving end.

Specifically, after completing encapsulation and mapping on a current frame of the service data, the sending end does not perform the encapsulation and mapping on a next frame of the service data any longer, and instead performs the encapsulation and mapping on the invalid data.

A duration of sending the modulated invalid data is longer than or equal to a sum of a duration of determining the target modulation mode by the receiving end and a duration of frame synchronization during decapsulation and demapping, and therefore it can be ensured that the data that is demodulated by the receiving end in a process of determining the target modulation mode and the frame synchronization is invalid data, so that the service data is not affected by switching of the modulation mode, and normal sending and receiving are implemented.

When sending the modulated invalid data, the sending end needs to always temporarily store the service data, and after the duration of sending the modulated invalid data meets the foregoing requirement, the sending end stops generating the invalid data and performs encapsulation and mapping on the service data instead. Therefore, a duration of temporarily storing the service data is equal to the duration of sending the modulated invalid data. The duration of temporarily storing the service data cannot be shorter than the duration of sending the modulated invalid data; otherwise, mixed transmission of the service data and the invalid data is caused, and the receiving end fails to correctly receive the service data. The duration of temporarily storing the service data may be longer than the duration of sending the modulated invalid data, then the receiving end can correctly receive the service data; however, a meaningless delay of the service data is caused, wasting a network resource.

Step S204: After completing the encapsulation and mapping on the invalid data, the sending end obtains the temporarily stored service data, performs encapsulation and mapping on the temporarily stored service data, modulates encapsulated and mapped service data according to the target modulation mode, and sends modulated data to the receiving end.

Step S205: The receiving end receives the modulated data; where the modulated data includes the modulated invalid data and modulated service data.

Step S206: The receiving end concurrently demodulates the modulated data according to all modulation modes supported by the receiving end to determine the target modulation mode.

Specifically, the receiving end concurrently demodulates the modulated data according to all the modulation modes supported by the receiving end to obtain a constellation point of each modulation mode, calculates a mean squared error between the constellation point of each modulation mode and a standard constellation point in a constellation diagram of the modulation mode, and determines the modulation mode that has the minimum value of the mean squared error (Mean Squared Error, MSE) as the target modulation mode.

Step S207: The receiving end switches the current modulation mode to the target modulation mode, and demodulates the modulated data according to the target modulation mode to obtain encapsulated and mapped data.

Step S208: The receiving end performs decapsulation and demapping on the encapsulated and mapped data to obtain the service data.

In a method for sending and receiving service data provided by this embodiment of the present invention, after obtaining a target modulation mode different from a current modulation mode, a sending end temporarily stores service data, inserts invalid data, and switches the current modulation mode to the target modulation mode, so that a receiving end receives the invalid data in a process of determining the target modulation mode and frame synchronization, and has determined the target modulation mode and performed the frame synchronization before receiving the service data, so as to implement hitless switching of a modulation mode and ensure normal sending and receiving of service data. Implementation is simple and reliability is high.

This embodiment provides another method for sending and receiving service data. The method includes:

Step S301: A sending end obtains a target modulation mode.

The target modulation mode is a modulation mode among the multiple modulation modes that are supported by the sending end and a receiving end.

Specifically, the sending end may obtain the target modulation mode according to service data information or software configuration.

Step S302: The sending end performs encapsulation and mapping on the service data.

Step S303: The sending end switches a current modulation mode to the target modulation mode, and modulates encapsulated and mapped service data according to the target modulation mode.

Step S304: The sending end sends modulated service data to the receiving end.

Step S305: The receiving end receives the modulated service data.

Step S306: The receiving end temporarily stores the modulated service data, and at the same time concurrently demodulates the modulated service data according to all modulation modes supported by the receiving end to determine the target modulation mode.

A duration of temporarily storing the modulated service data by the receiving end is equal to a duration from a time when the receiving end receives the modulated service data to a time when the modulation mode is switched to the target modulation mode. Therefore, it is ensured that, when determining the target modulation mode, the receiving end temporarily stores the service data modulated according to the target modulation mode; when the modulation mode is switched to a target mode, the receiving end starts to demodulate the service data modulated according to the target modulation mode, so that the service data is not affected by switching of the modulation mode, and normal sending and receiving are implemented.

The receiving end concurrently demodulates the modulated service data according to all the modulation modes supported by the receiving end to obtain a constellation point of each modulation mode; calculates a mean squared error between the constellation point of each modulation mode and a standard constellation point in a constellation diagram of the modulation mode; and determines the modulation mode that has the minimum value of the mean squared error as the target modulation mode.

Step S307: The receiving end obtains the temporarily stored modulated service data, switches the current modulation mode to the target modulation mode, and demodulates the temporarily stored modulated service data according to the target modulation mode to obtain the encapsulated and mapped service data.

Step S308: The receiving end performs decapsulation and demapping on the encapsulated and mapped service data to obtain the service data.

In another method for sending and receiving service data provided by this embodiment of the present invention, after obtaining a target modulation mode different from a current modulation mode, a sending end switches the current modulation mode to the target modulation mode, and normally sends modulated service data, and a receiving end temporarily stores the modulated service data that is received, so that the receiving end has determined the target modulation mode before demodulating the service data that is modulated according to the target modulation mode, so as to implement hitless switching of a modulation mode and ensure normal sending and receiving of service data. Implementation is simple and reliability is high.

Figure 2:
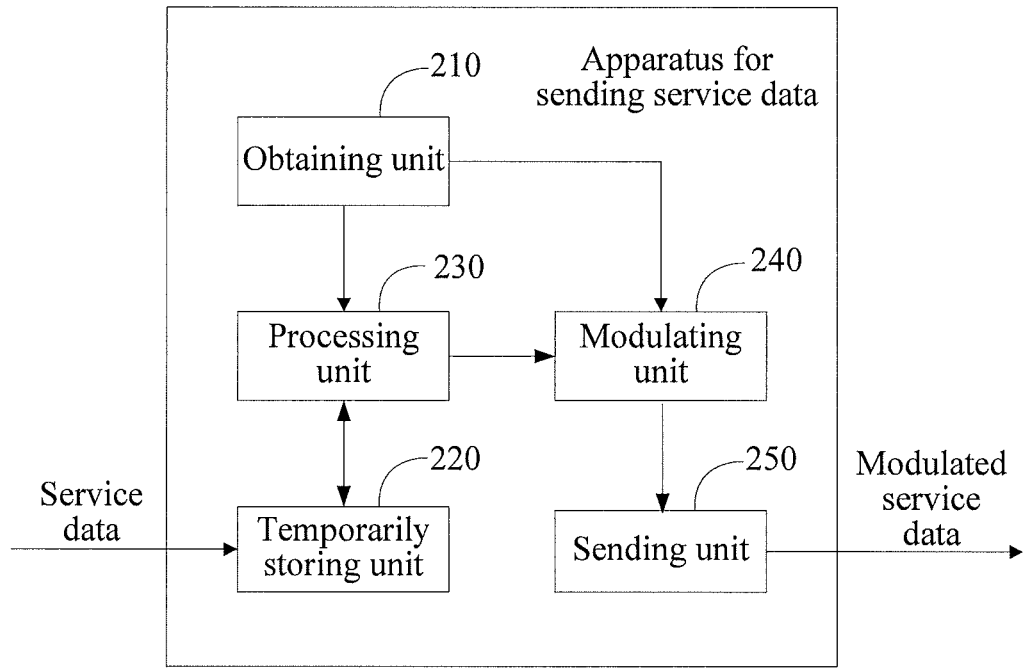
FIG. 2 is a schematic structural diagram of an apparatus for sending service data according to an embodiment of the present invention.

This embodiment provides an apparatus for sending service data, as shown in FIG. 2. An entity of the apparatus may be a sending end of the service data, and the apparatus includes an obtaining unit 210, a temporarily storing unit 220, a processing unit 230, a modulating unit 240, and a sending unit 250.

The obtaining unit 210 is configured to obtain a target modulation mode different from a current modulation mode.

The temporarily storing unit 220 is configured to temporarily store the service data at the same time when the processing unit 230 generates invalid data.

The processing unit 230 is configured to generate the invalid data after the obtaining unit 210 obtains the target modulation mode: and further configured to: after the encapsulation and mapping on the invalid data is completed, obtain the service data temporarily stored by the temporarily storing unit 220, and perform encapsulation and mapping on temporarily stored service data.

Specifically, after encapsulation and mapping on a current frame of the service data is completed, the encapsulation and mapping is not performed on a next frame of the service data any longer, but the encapsulation and mapping is performed on the invalid data.

The modulating unit 240 is configured to switch the current modulation mode to the target modulation mode, and modulate, according to the target modulation mode, invalid data encapsulated and mapped by the processing unit 230; and further configured to modulate, according to the target modulation mode, service data encapsulated and mapped by the processing unit 230.

The sending unit 250 is configured to send invalid data modulated by the modulating unit 240 to a receiving end; and further configured to send service data modulated by the modulating unit 240 to the receiving end.

A duration of sending the invalid data modulated by the modulating unit 240 is longer than or equal to a sum of a duration of determining the target modulation mode by the receiving end and a duration of frame synchronization during decapsulation and demapping.

Figure 3:
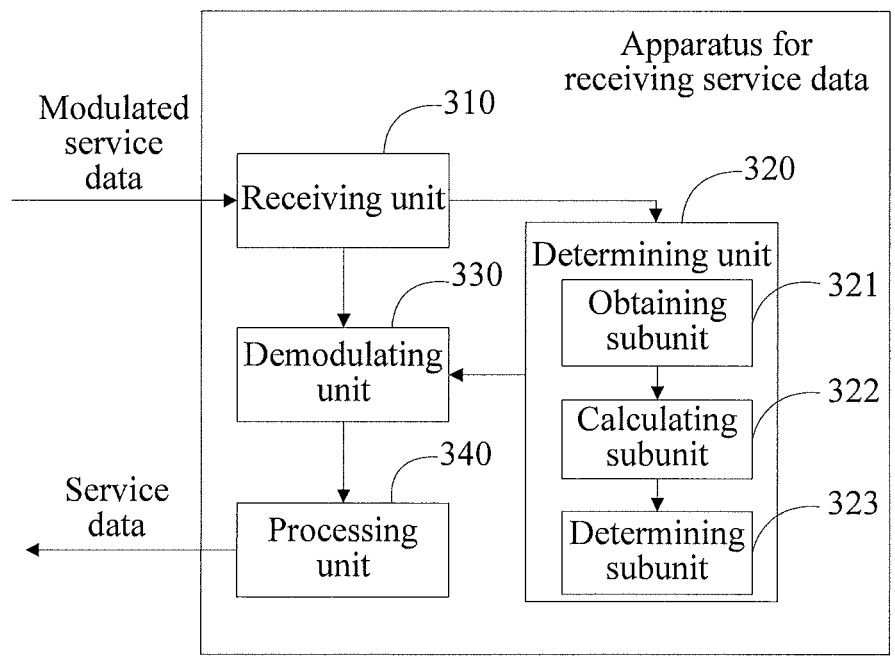
FIG. 3 is a schematic structural diagram of an apparatus for receiving service data according to an embodiment of the present invention.

This embodiment provides an apparatus for receiving service data, as shown in FIG. 3. An entity of the apparatus may be a receiving end of the service data, and the apparatus includes a receiving unit 310, a determining unit 320, a demodulating unit 330, and a processing unit 340.

The receiving unit 310 is configured to receive modulated data; where the modulated data includes modulated invalid data and modulated service data.

The determining unit 320 is configured to concurrently demodulate the modulated data according to all modulation modes supported by this receiving apparatus to determine a target modulation mode.

The demodulating unit 330 is configured to switch a current modulation mode to the target modulation mode; and further configured to demodulate the modulated data according to the target modulation mode to obtain encapsulated and mapped data.

The processing unit 340 is configured to perform decapsulation and demapping on the encapsulated and mapped data to obtain the service data.

Further, the determining unit 320 may specifically include:

an obtaining subunit 321, configured to concurrently demodulate the modulated data according to all the modulation modes supported by this receiving apparatus to obtain a constellation point of each modulation mode;

a calculating subunit 322, configured to calculate a mean squared error between the constellation point of each modulation mode and a standard constellation point in a constellation diagram of the modulation mode; and a determining subunit 323, configured to determine the modulation mode that has the minimum value of the mean squared error as the target modulation mode.

Figure 4:
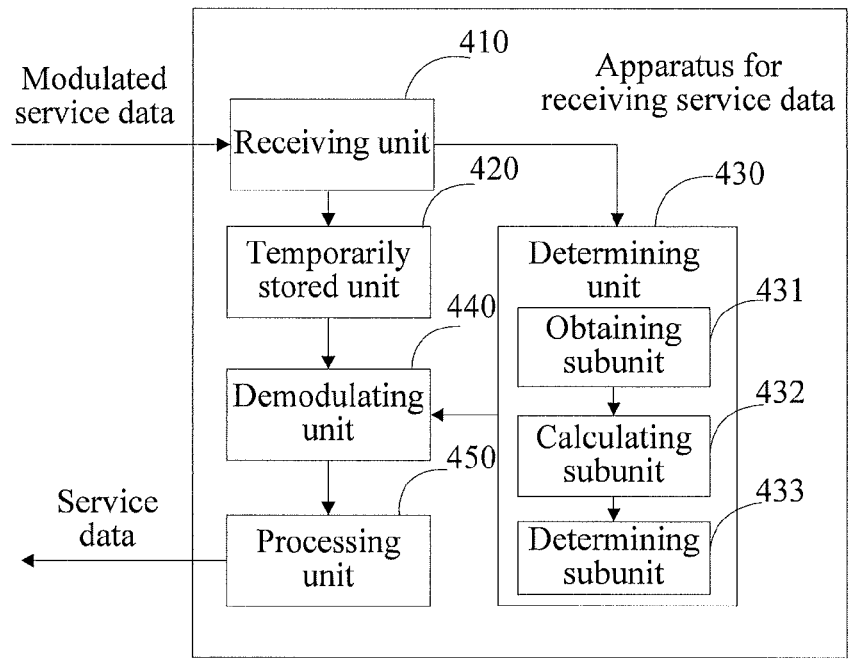
FIG. 4 is a schematic structural diagram of another apparatus for receiving service data according to an embodiment of the present invention.

This embodiment provides another apparatus for receiving service data, as shown in FIG. 4. An entity of the apparatus may be a receiving end of the service data, and the apparatus includes a receiving unit 410, a temporarily storing unit 420, a determining unit 430, a demodulating unit 440, and a processing unit 450.

The receiving unit 410 is configured to receive modulated service data.

The temporarily storing unit 420 is configured to temporarily store the modulated service data.

A duration of temporarily storing the modulated service data by the temporarily storing unit 420 may be equal to a duration from a time when the receiving apparatus receives the modulated service data to a time when a current modulation mode is switched to a target modulation mode.

The determining unit 430 is configured to, at the same time when the modulated service data is temporarily stored, concurrently demodulate the modulated service data according to all modulation modes supported by this receiving apparatus to determine the target modulation mode.

The demodulating unit 440 is configured to obtain modulated service data temporarily stored by the temporarily storing unit 420, switch the current modulation mode to the target modulation mode, and demodulate the temporarily stored modulated service data according to the target modulation mode to obtain encapsulated and mapped service data.

The processing unit 450 is configured to perform decapsulation and demapping on the encapsulated and mapped service data to obtain the service data.

Further, the determining unit 430 may specifically include:

an obtaining subunit 431, configured to concurrently demodulate the modulated service data according to all the modulation modes supported by this receiving apparatus to obtain a constellation point of each modulation mode;

a calculating subunit 432, configured to calculate a mean squared error between the constellation point of each modulation mode and a standard constellation point in a constellation diagram of the modulation mode; and a determining subunit 433, configured to determine the modulation mode that has the minimum value of the mean squared error as the target modulation mode.

Content such as information interaction and an execution process between the various units inside the apparatus provided by this embodiment is based on a conception that is the same as that of the method embodiments of the present invention. Therefore, reference may be made to description in the method embodiments of the present invention for specific content, which is not repeated herein.

Figure 5:
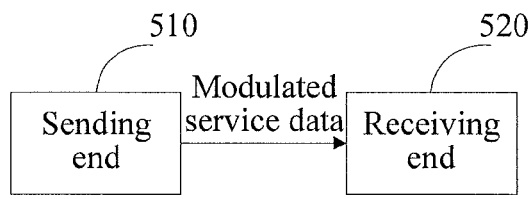
FIG. 5 is a schematic structural diagram of a system for sending and receiving service data according to an embodiment of the present invention.

This embodiment provides a system for sending and receiving service data. As shown in FIG. 5, the system includes: a sending end 510 and a receiving end 520.

The sending end 510 includes an obtaining unit, a temporarily storing unit, a processing unit, a modulating unit, and a sending unit. For specific content, refer to the obtaining unit 210, the temporarily storing unit 220, the processing unit 230, the modulating unit 240, and the sending unit 250 of the apparatus for sending service data in the foregoing embodiment, which is not repeated herein.

The receiving end 520 includes a receiving unit, a determining unit, a demodulating unit, and a processing unit. For specific content, refer to the receiving unit 310, the determining unit 320, the demodulating unit 330, and the processing unit 340 of the apparatus for receiving service data according to the foregoing embodiment, which is not repeated herein.

Figure 6:
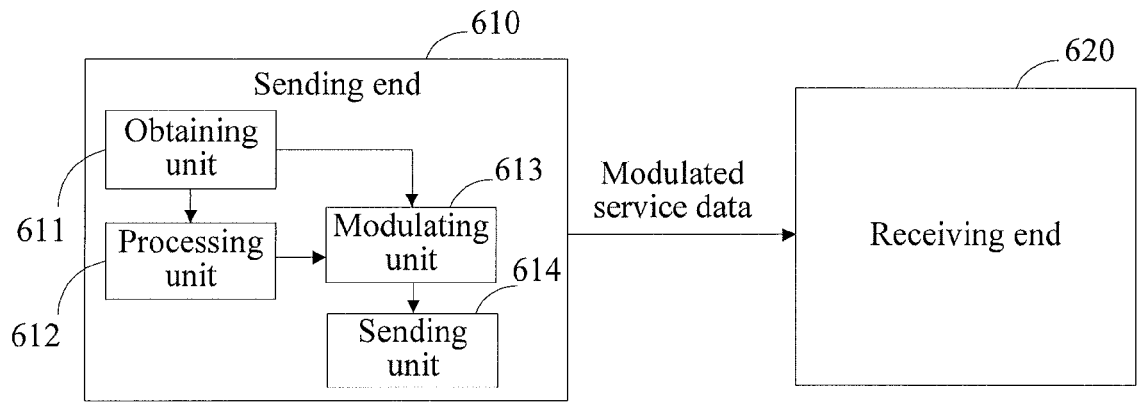
FIG. 6 is a schematic structural diagram of another system for sending and receiving service data according to an embodiment of the present invention.

This embodiment provides another system for sending and receiving service data. As shown in FIG. 6, the system includes: a sending end 610 and a receiving end 620.

The sending end 610 is configured to obtain a target modulation mode different from a current modulation mode; further configured to perform encapsulation and mapping on service data; further configured to switch the current modulation mode to the target modulation mode, and modulate encapsulated and mapped service data according to the target modulation mode; and further configured to send modulated service data to a receiving apparatus; and includes:

an obtaining unit 611, configured to obtain the target modulation mode different from the current modulation mode;

a processing unit 612, configured to perform the encapsulation and mapping on the service data;

a modulating unit 613, configured to switch the current modulation mode to the target modulation mode, and modulate the encapsulated and mapped service data according to the target modulation mode; and a sending unit 614, configured to send the modulated service data to the receiving apparatus.

The receiving end 620 includes a receiving unit, a temporarily storing unit, a determining unit, a demodulating unit, and a processing unit. For specific content, refer to the receiving unit 410, the temporarily storing unit 420, the determining unit 430, the demodulating unit 440, and the processing unit 450 of the apparatus for receiving service data according to the foregoing embodiment, which is not repeated herein.

For a system for sending and receiving service data provided by this embodiment, content such as specific implementation processes of the various units and information interaction between the various units is based on a conception that is the same as that of the method embodiments of the present invention. Therefore, reference may be made to the method embodiments for the content, which is not repeated herein.

Embodiments of the present invention provide a method, an apparatus, and a system for sending and receiving service data, so as to implement hitless switching of a modulation mode and ensure normal sending and receiving of service data. Implementation is simple and reliability is high.

A person of ordinary skill in the art may understand that all or a part of the processes of the method embodiments may be implemented by a computer program instructing relevant hardware. The program may be stored in a computer readable storage medium. When the program runs, the processes of the method embodiments are performed. The storage medium may include: a magnetic disk, an optical disc, a read-only memory (Read-Only Memory, ROM), or a random access memory (Random Access Memory, RAM).

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for sending service data, comprising:
   obtaining, by a sending end, a target modulation mode different from a current modulation mode;
   generating, by the sending end, invalid data, and temporarily storing service data at the same time;
   performing, by the sending end, encapsulation and mapping on the invalid data, switching the current modulation mode to the target modulation mode, modulating encapsulated and mapped invalid data according to the target modulation mode, and sending modulated invalid data to a receiving end; and
   after the sending end completes the encapsulation and mapping on the invalid data, obtaining, by the sending end, the temporarily stored service data, performing encapsulation and mapping on the temporarily stored service data, modulating encapsulated and mapped service data according to the target modulation mode, and sending modulated service data to the receiving end.

2. A method for sending service data, comprising:
   obtaining, by a sending end, a target modulation mode different from a current modulation mode;
   generating, by the sending end, invalid data, and temporarily storing service data at the same time;
   performing, by the sending end, encapsulation and mapping on the invalid data, switching the current modulation mode to the target modulation mode, modulating encapsulated and mapped invalid data according to the target modulation mode, and sending modulated invalid data to a receiving end; and
   after the sending end completes the encapsulation and mapping on the invalid data, obtaining, by the sending end, the temporarily stored service data, performing encapsulation and mapping on the temporarily stored service data, modulating encapsulated and mapped service data according to the target modulation mode, and sending modulated service data to the receiving end, wherein a duration of sending the modulated invalid data is longer than or equal to a sum of a duration of determining the target modulation mode by the receiving end and a duration of frame synchronization during decapsulation and demapping.

3. The method according to claim 1, wherein the method further comprises:
   before the performing, by the sending end, encapsulation and mapping on the invalid data, completing encapsulation and mapping on a current frame of the service data.

4. A method for receiving service data, comprising:
   receiving, by a receiving end, modulated service data;
   temporarily storing, by the receiving end, the modulated service data, and at the same time concurrently demodulating the modulated service data according to all modulation modes supported by the receiving end to determine a target modulation mode;
   obtaining, by the receiving end, the temporarily stored modulated service data, switching a current modulation mode to the target modulation mode, and demodulating the temporarily stored modulated service data according to the target modulation mode to obtain encapsulated and mapped service data; wherein a duration of temporarily storing the modulated service data by the receiving end is equal to a duration from a time when the receiving end receives the modulated service data to a time when the current modulation mode is switched to the target modulation mode; and
   performing, by the receiving end, decapsulation and demapping on the encapsulated and mapped service data to obtain the service data.

5. The method according to claim 4, wherein the concurrently demodulating the modulated service data according to all modulation modes supported by the receiving end to determine a target modulation mode comprises:
   concurrently demodulating the modulated service data according to all the modulation modes supported by the receiving end to obtain a constellation point of each modulation mode; calculating a mean squared error between the constellation point of each modulation mode and a standard constellation point in a constellation diagram of the modulation mode; and determining the modulation mode that has the minimum value of the mean squared error as the target modulation mode.

6. An apparatus for receiving service data, comprising:
   a receiving unit, configured to receive modulated data, wherein the modulated data comprises modulated invalid data and modulated service data, and temporarily storing the modulated service data;
   a determining unit, configured to concurrently demodulate the modulated data according to all modulation modes supported by the receiving apparatus to determine a target modulation mode;
   a demodulating unit, configured to switch a current modulation mode to the target modulation mode, and further configured to demodulate the modulated data according to the target modulation mode to obtain encapsulated and mapped data; wherein a duration of temporarily storing the modulated service data by the receiving unit is equal to a duration from a time when the receiving unit receives the modulated data to a time when the current modulation mode is switched to the target modulation mode; and a processing unit, configured to perform decapsulation and demapping on the encapsulated and mapped data to obtain the service data.

7. The apparatus according to claim 6, wherein the determining unit comprises:

an obtaining subunit, configured to concurrently demodulate the modulated data according to all the modulation modes supported by the receiving apparatus to obtain a constellation point of each modulation mode;

a calculating subunit, configured to calculate a mean squared error between the constellation point of each modulation mode and a standard constellation point in a constellation diagram of the modulation mode; and a determining subunit, configured to determine the modulation mode that has the minimum value of the mean squared error as the target modulation mode.

8. A system for sending and receiving service data, comprising: a sending apparatus and the receiving apparatus according to claim 6, wherein:

the sending apparatus comprising:

an obtaining unit, configured to obtain a target modulation mode different from a current modulation mode;

a temporarily storing unit, configured to temporarily store the service data at the same time when a processing unit generates invalid data;

the processing unit, configured to generate the invalid data after the obtaining unit obtains the target modulation mode, and perform encapsulation and mapping on the invalid data and further configured to: after the encapsulation and mapping on the invalid data is completed, obtain the service data temporarily stored by the temporarily storing unit, and perform encapsulation and mapping on the temporarily stored service data;

a modulating unit, configured to switch the current modulation mode to the target modulation mode, and modulate, according to the target modulation mode, invalid data encapsulated and mapped by the processing unit; and further configured to modulate, according to the target modulation mode, service data encapsulated and mapped by the processing unit; and a sending unit, configured to send invalid data modulated by the modulating unit to a receiving end, and further configured to send service data modulated by the modulating unit to the receiving end.

* * * * *